May 2, 1939.                  J. T. HUME ET AL                    2,156,759
                         CABINET DOMESTIC APPLIANCE
                         Filed Sept. 10, 1936        6 Sheets-Sheet 3

Fig. 4

Inventors:
John T. Hume
Colby Van Westrum
BY: George J. Haight ATTY.

Fig. 6

Patented May 2, 1939

2,156,759

UNITED STATES PATENT OFFICE 2,156,759

CABINET DOMESTIC APPLIANCE

John T. Hume, Chicago, Ill., and Colby Van Westrum, Houston, Tex., assignors to Electric Household Utilities Corporation, Chicago, Ill. a corporation of Illinois Application September 10, 1936, Serial No. 100,104

25 Claims. (Cl. 38—1)

This invention relates to improvements in a cabinet ironer combined with a mixer, and more particularly to ironing machines and food mixing machines or devices of the domestic type adapted to be housed in a cabinet when not in use.

One object of the invention is to provide an ironer mechanism associated with a cabinet into which the ironer mechanism may be folded and completely enclosed when not in use, and from which the ironer may be withdrawn for use and placed in operating position, wherein the ironer is supported solely by the cabinet when in operative position, thereby dispensing with all auxiliary supports.

Another object of the invention is to provide a cabinet adapted to house both an ironing mechanism or ironer unit and a food mixing device or machine and also house a common driving mechanism for both the ironer and the mixer, the cabinet being further designed to support the ironer mechanism and mixing device in operative positions when withdrawn from the same for use.

A further object of the invention is to provide a cabinet and an ironer and means connecting the ironer to the cabinet so that the ironer may be manually moved into and out of the cabinet, wherein the connecting means positively holds the ironer in operating position outside of the cabinet while in use, maintains it in folded condition within the cabinet when not in use, and supports and guides the same during its movement out of and into the cabinet from one of said positions to the other in such a manner that a minimum of physical effort is required on the part of the operator in manipulating the same.

Other objects of the invention will more clearly appear from the description and claims hereinafter following.

In the drawings, forming a part of this specification.

In said drawings, A indicates a cabinet designed to house and support an ironer mechanism and also house a food mixer. This cabinet may be of any suitable type for the purpose but is preferably made of sheet metal and has the top thereof arranged to serve as a table. As shown, the cabinet A is of substantially rectangular, boxlike form and is supported for rolling movement by casters 10—10, so that it may be moved about for convenience.

The cabinet A comprises spaced, vertical side walls 11—11; spaced, vertical front and rear walls 12 and 13; a top wall 14; and a bottom wall 15. The front wall 12 is provided with a door opening of rectangular outline, which is closed by a pair of hinged doors 16—16 which swing outwardly about vertical axes.

The ironer mechanism, which is indicated by B, is of the type generally known as domestic ironers and forms a unit by itself, in that the parts thereof are all related in such a manner that it may be bodily withdrawn from or swung out of the cabinet into operating position and returned or swung back to enclosed position within the cabinet.

The ironer unit illustrated is of well known type, and comprises an elongated, flat baseboard 17 of substantially rectangular shape, a supporting head or standard 18 upstanding from the baseboard, an ironer roll 19, and a cooperating shoe 20, the roll 19 and the shoe 20 being carried by the standard 18. These elements of the ironer unit B extend in parallel relation to the baseboard and are driven through suitable well known mechanism contained within the head or standard 18.

Figure 3:
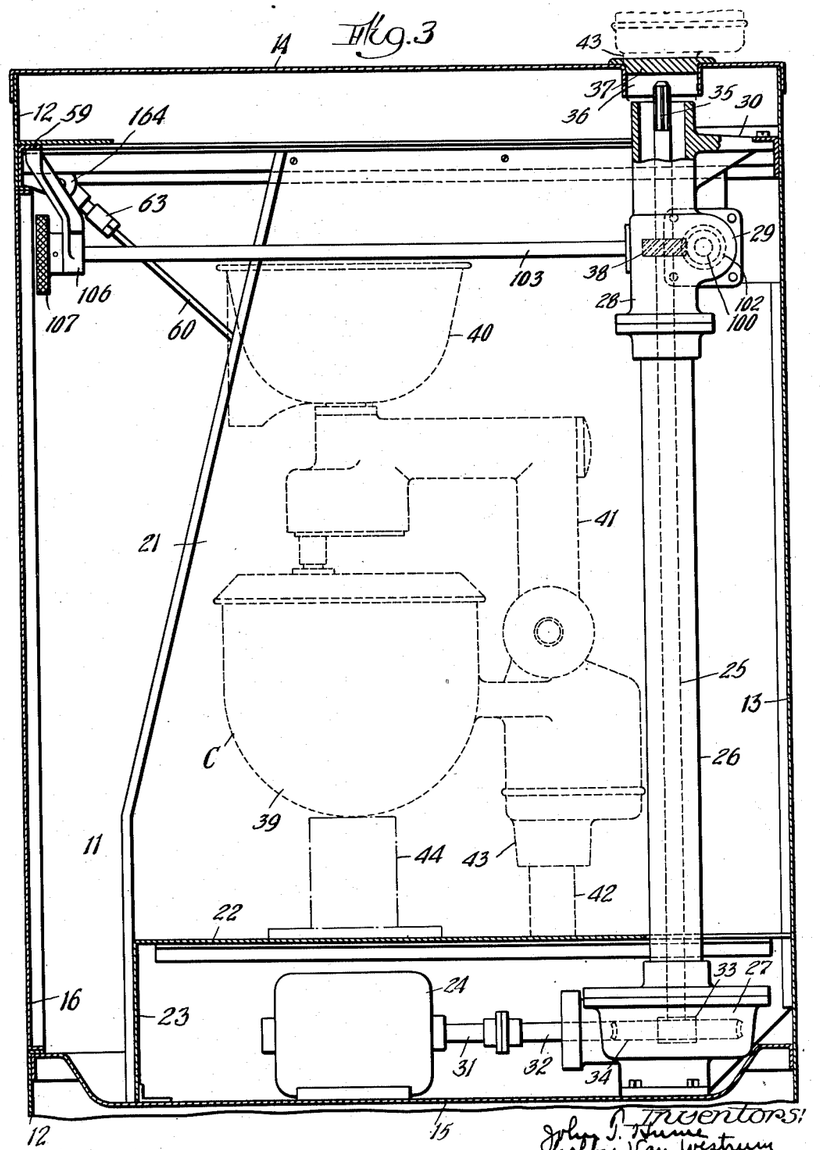
Fig. 3 is an enlarged, vertical, sectional view of the cabinet, said section being taken through the mixing machine compartment of the cabinet and corresponding substantially to the line 3—3 of Fig. 4, the common driving mechanism for both the ironer and the food mixing device or machine being shown partly in elevation and partly in section, and the food mixing machine being indicated in dotted lines.

The ironer unit B when housed within the cabinet is entirely enclosed thereby and the cabinet is of sufficient height to accommodate the unit in an upright or substantially vertical position. When the unit B is housed within the cabinet, it occupies part only of the same, the remainder of the cabinet being utilized to accommodate a food mixer, of well known type, which is shown in dotted lines in Fig. 3 and indicated by C.

The cabinet A is preferably divided into two sections by a vertical partition wall 21 extending from the rear wall toward the front wall of the cabinet, thus providing separate compartments for the ironer and mixer. The compartment which serves to house the mixer is provided with a raised floor or shelf 22, on which the mixer C rests when placed within the cabinet. The floor or shelf 22 spans the space between the partition wall 21 and the corresponding side wall 11 of the cabinet, has its front end spaced from the front of the cabinet, and extends to the rear wall 13 of the latter. An upright wall 23 spans the space between the front end portion of the shelf 22 and the bottom wall 15 of the cabinet A and serves as a support for said front end portion of the shelf. The shelf 22, together with the wall 23 and the corresponding side wall 11 of the cabinet, define a chamber within which an electric motor 24 or other similar driving mechanism is housed.

The motor 24 is supported on and secured to the bottom wall 15 of the cabinet and is geared to a vertical drive shaft 25, which serves to transmit rotary motion to either the mixer C or the ironer unit B. The shaft 25 is rotatably journaled in a substantially tubular housing 26 having an enlarged gear casing portion 27 at the lower end thereof, which is supported on and fixed to the bottom wall 15 of the cabinet A. At the upper end, the tubular housing 26 is provided with a section 28 having a laterally enlarged portion 29 forming another gear casing. The section 28 has a pair of outstanding, horizontally disposed, bracing and supporting arms 30—30 adjacent to the upper extremity thereof, which arms are disposed at right angles to each other and fixed respectively to the rear wall 13 and the corresponding side wall 11 of the cabinet A. As clearly shown in Fig. 3, the lower gear casing 27 is disposed below the shelf or floor 22 and the housing 26 is located within the mixer compartment of the cabinet.

The motor 24 has the usual driving shaft 31, which is operatively connected in driving relation with the shaft 25. The shaft 31 has an extension 32 coupled thereto, the extension shaft 32 being journaled in the gear casing 27 and having a worm member 33 thereon in mesh with a worm wheel or gear 34 fixed to the bottom end of the shaft 25. As will be evident, the worm gear 33—34 serves as a speed-reducing transmission mechanism for imparting rotary motion from the motor 24 to the shaft 25 for operating either the mixer or the ironer unit.

The upper extremity of the shaft 25 is splined, as indicated at 35, for connection with a coupling element of the drive mechanism of the mixer, or any other similar device which it may be found convenient or desirable to drive thereby. The splined portion 35 of the shaft 25 projects beyond the upper end of the section 28 of the tubular housing 26 and is accessible for coupling purposes through an opening 36 in the top wall 14 of the cabinet A. A cover plate or cap 37 is preferably used for closing the opening 36 when the shaft 25 is not utilized for driving a device supported on the tablelike top of the cabinet. Inwardly of the splined portion 35, the upper section of the shaft 25 carries a helical gear 38 fixed thereto and employed for a purpose hereinafter pointed out. The gear 38 rotates with the shaft 25 and is located thereon so as to be disposed within the gear casing 29 of the housing 26 to cooperate with a certain other gear member for driving the ironer unit, as hereinafter pointed out.

The food mixer C is of the type which is adapted to be operated as both a mixer and a fruit juice extractor, the same being provided with the usual mixing bowl 39 and fruit juice extractor bowl 40 carried by a standard 41. A rotary beater and a rotary fruit juice extractor, of the usual type, cooperate respectively with the mixer and extractor bowls, the same being driven by any suitable gearing contained in the standard 41. The standard 41 has a tubular, sleevelike, depending extension 42 within which a vertical drive shaft for the operating connection with the drive gearing in the pedestal is journaled, the drive shaft having a suitable coupling element at the lower extremity thereof adapted to be engaged over and in driving relation with the splined upper end 35 of the shaft 25. The tubular extension 42 of the standard 41 is provided with an enlarged, tapered portion 43 adjacent to the bottom of the pedestal and spaced from the lower end of the extension, which tapered portion 43 is adapted to seat in the opening 36 when the mixer C is mounted for use on top of the cabinet. Inasmuch as the extension 42 of the standard projects some distance below the level of the bottom of the mixer bowl 39 and rests on the shelf 22 when the mixer is housed in the cabinet, a suitable removable supporting pedestal 44 is employed to occupy the space between the bottom of the bowl 39 and the shelf 22 to support the bowl and thus give the mixer firm support and hold the same in vertical position.

As hereinbefore pointed out, the ironer unit B is connected to and supported by the cabinet A and is adapted to be moved inwardly and outwardly of the same. A swinging carriage D, to which the unit is hinged or pivotally connected, is employed for this purpose. The swinging carriage D includes laterally spaced side members 45 and 46, which are of similar design, except as hereinafter pointed out. Each side member comprises inner and outer arms 47 and 48 and upstanding and depending arms 49 and 50, all of said arms being preferably in the form of tubular members connected by a four-way fitting or coupling joint 51. The inner arm 47 is longer than the outer arm 48, and these arms extend in a straight line in opposite directions from the joint member 51. The upstanding and depending arms 49 and 50 are disposed at obtuse angle to each other and extend in opposite directions from the fitting or joint member 51. The rear ends of the arms 47—47 are connected by a transverse member 52, which is rigid with said arms, the member 52 being also of tubular form and having the opposite ends thereof supported for pivotal movement, one end being supported by and journaled in a suitable bearing in the gear case 29 of the top section 28 of the tubular housing 26, and the other end thereof being journaled in a bearing bracket 53 secured to the back wall 13 and the side wall 11 at the opposite side of the cabinet. The carriage D is thus pivoted for swinging movement about a horizontal axis at the top portion of the cabinet and closely adjacent to the rear wall 13 thereof.

Figures 1, 2:
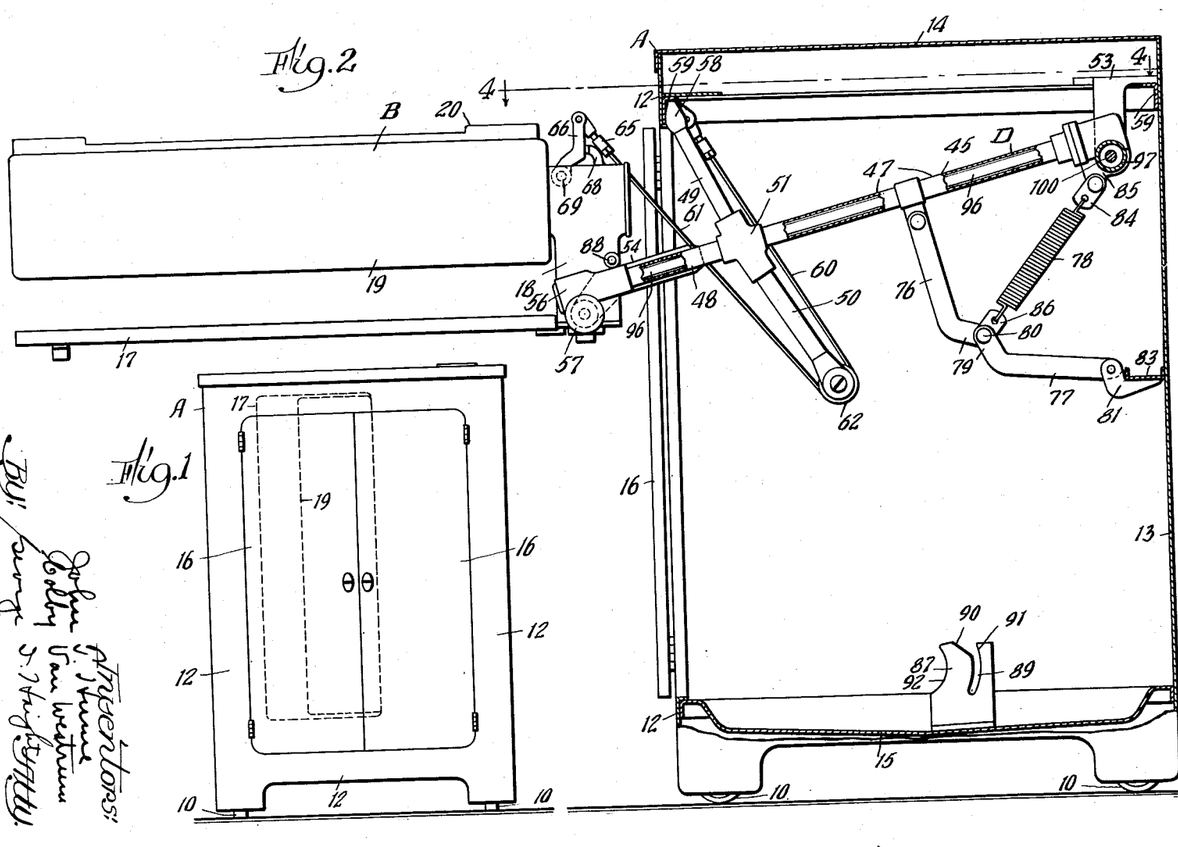
Fig. 1 is a front elevational view of the cabinet containing the improved mechanisms which are combined therewith.
Fig. 2 is an enlarged, vertical, sectional view of the contact with the doors of the same opened and the ironer projected for use, said section being taken through the ironer compartment of the cabinet and corresponding substantially to the line 2—2 of Fig. 4.

The ironer unit B is pivotally connected to the outer ends of the arms 48—48 of the carriage D, said arms 48—48 being arranged on opposite sides of the ironer unit with their ends in embracing relation with the standard 18. As clearly shown in Fig. 4, the arm 48 of the side member 46 is flattened to barlike shape and has an enlarged bosslike end portion 54 provided with a pivot pin receiving opening accommodating a pin 55 fixed to and laterally projecting from the standard 18 of the ironer unit B. The arm 48 of the side member 45 of the carriage D is of tubular form throughout and has an enlarged portion at the outer end thereof forming a gear casing 56. As shown most clearly in Figs. 2 and 4, the gear casing end 56 of the last named arm has a depending section 57, which is suitably journaled to the corresponding side of the standard 18 for rotation on a horizontal axis aligned with the axis of the pivot pin 55. The ironer unit B is thus pivotally supported at the outer ends of the arms 48—48 of the carriage D for swinging movement about a horizontal axis with respect to said carriage, and the carriage is mounted for bodily swinging movement about its pivotal connection with the cabinet. Upward and outward swinging movement of the carriage D is limited by the arms 49—49 of the same, each of said arms being provided with a wedge-shaped head 58 at the outer end thereof adapted to wedge into the corner of an angle bar 59 fixed to the inner side of the front wall 12 of the cabinet adjacent to the top of the latter, as shown in Fig. 2. The angle bar 59 thus forms a positive stop for the carriage.

Means is provided, through the operation of which the ironer unit B is maintained in operating position through the action of its own weight when completely withdrawn from the cabinet. This means cooperates with the carriage D to maintain the latter in position at the limit of its outward and upward movement and comprises cable members 60—60 and 61—61 anchored respectively to the cabinet A and the ironer unit B and adapted to wind on a drum 62 rotatably supported at the outer ends of the depending arms 50—50 of the carriage D. The two cables 60—60 are disposed at opposite sides of the carriage D. Each cable 60 has its outer end fixed to an anchoring member 63 pivotally supported in a forked bracket 164 secured to the front wall 12 of the cabinet at the top of the latter in the corner provided by the angle bar stop member 59, as shown in Figs. 2, 3, 4, 5, and 6. The inner end of each cable 60 is anchored to the drum 62 at the corresponding end of the latter and is adapted to wind on the same, the corresponding end of the drum being formed with a thread 64 which provides a helical guide groove for said cable. The threads 64—64 at opposite ends of the drum 62 are preferably respectively right and left-hand so that the cables 60—60 will travel laterally inwardly of the drum when unwound therefrom and in a reverse direction when wound upon said drum. The two cables 61—61 have their outer ends fixed to anchoring members 65—65 pivotally connected to the upper end of a swinging bracket arm 66 mounted on the standard 18 of the ironer unit B, as shown in Figs. 2, 4, 5, 6, and 8. The inner ends of the cables 61—61 are anchored to the drum 62 near the center thereof and are adapted to wind on said drum in a direction reverse to the winding of the cables 60—60. The drum is preferably provided with two sets of reversely arranged threads 67—67 at the central portion thereof, which provide guide grooves for the cables 61—61 in being wound on and unwound from the drum 62.

Figure 5:
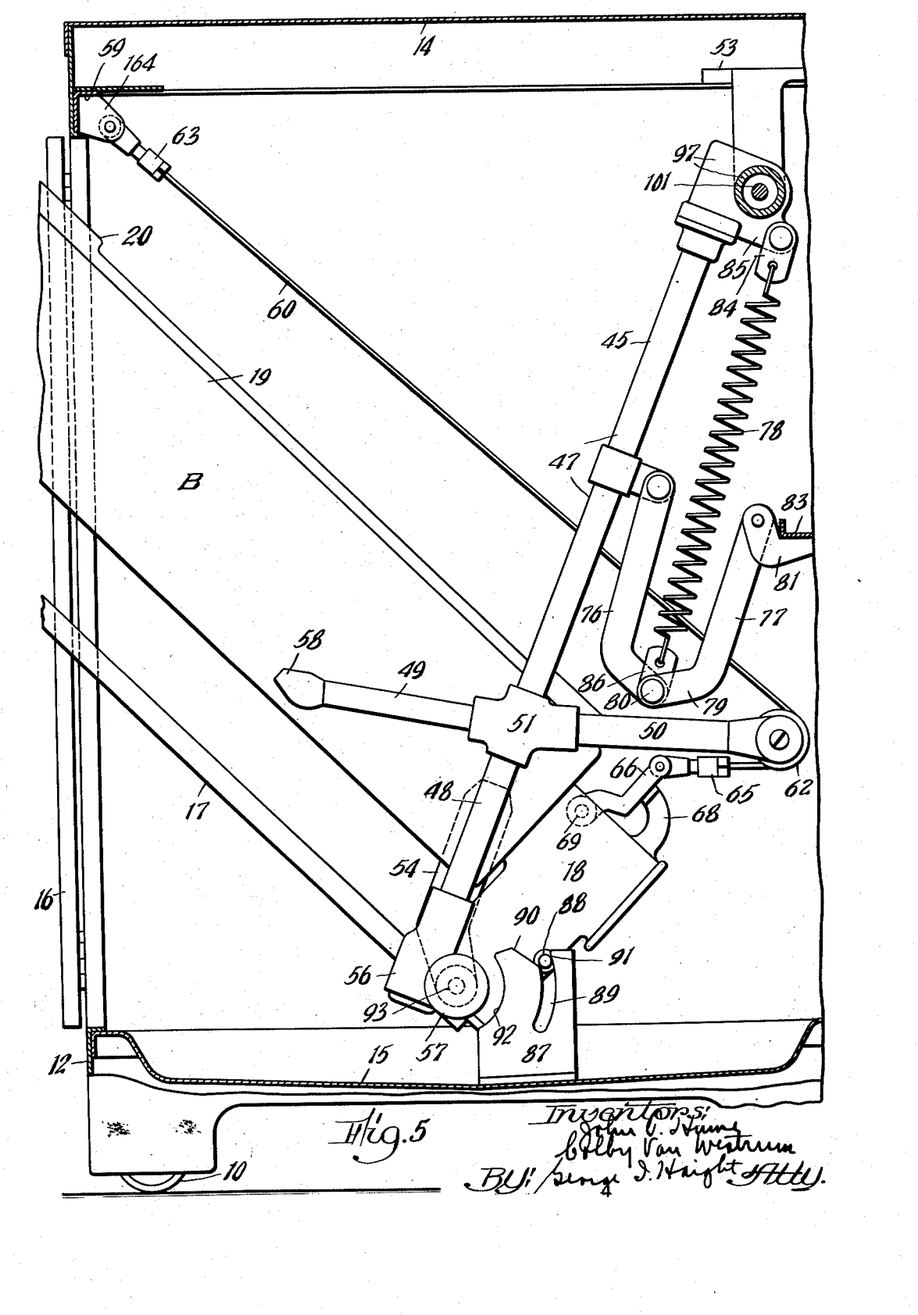
Fig. 5 is a view similar to Fig. 2, on a still further enlarged scale, but showing the ironer moved partially into the cabinet, said ironer being partly broken away.
Figure 6:
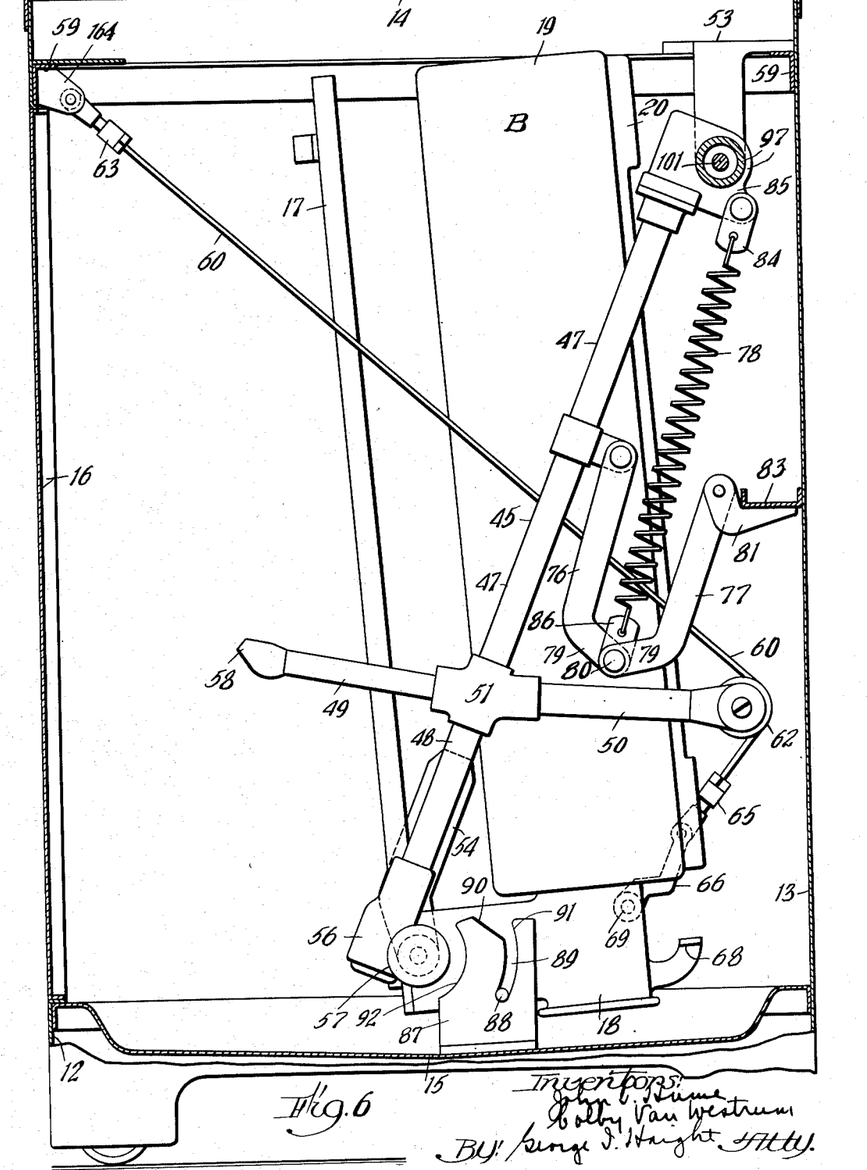
Fig. 6 is a view similar to Fig. 5, but showing the ironer folded in completely enclosed position within the cabinet.
Figures 7, 9:
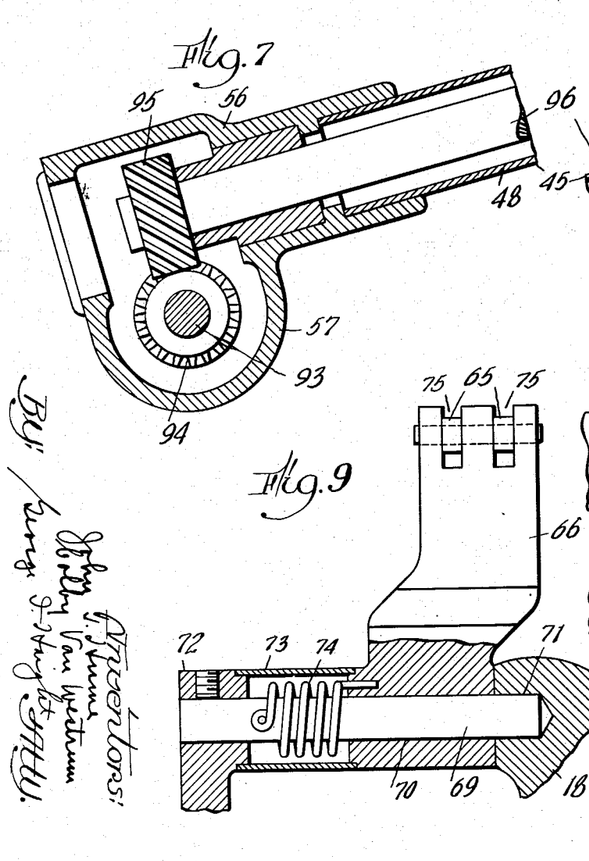
Fig. 7 is a vertical, sectional view, on an enlarged scale, through the outer end of one of the supporting arms for the ironer unit, which arm serves as a housing and support for the driving connections to the ironer, said section corresponding substantially to the line 7—7 of Fig. 4.
Fig. 9 is a vertical, sectional view, on an enlarged scale, corresponding substantially to the line 9—9 of Fig. 4, illustrating in detail certain anchoring means for a certain flexible connection in the form of cables for supporting and guiding the ironer unit.
Figure 8:
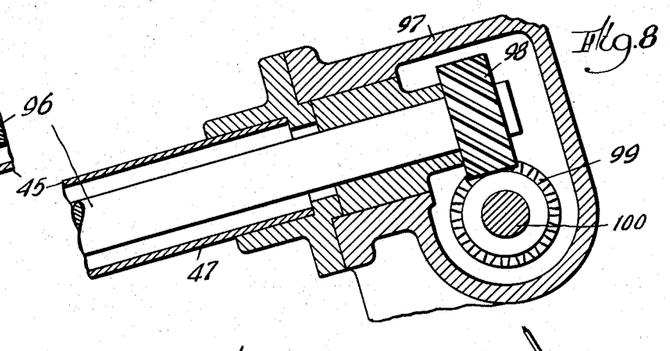
Fig. 8 is a vertical, sectional view, also on an enlarged scale, corresponding substantially to the line 8—8 of Fig. 4 and showing the inner end of the supporting arm illustrated in Fig. 7.

The swinging bracket arm 66 has its movement in clockwise direction, as viewed in Figs. 2, 5, and 6, limited by an upstanding, fixed stop finger 68 on top of the standard 18 of the ironer unit B. As shown most clearly in Fig. 9, the swinging or rocking arm 66 is pivotally supported on a pin or short shaft 69, the arm being provided with a journal opening 70 at its base, through which the pin 69 extends. The pin 69 has its inner end seated in a socket 71 provided in the top portion of the standard 18. The outer end of the pin 69 is supported by a bracket 72 to which it is fixed by a set screw, as shown in Fig. 9. The bracket 72 is suitably fixed to the top of the standard 18 in spaced relation to the base portion of the arm 66. The space between the base of the arm 66 and the bracket 72 is closed by a short, tubular sleeve section 73 which serves as a housing for a coil spring 74 surrounding the pin 69. As shown most clearly in Fig. 9, one end of the coil of the spring 74 is fixed to the pin 69 and the other end thereof is fixedly anchored to the base portion of the arm 66. This spring 74 holds the arm 66 under tension and yieldingly resists movement thereof in a contraclockwise direction, as viewed in Figs. 2, 5, and 6, thus urging the same toward the stop finger 68. The upper end of the arm 66 is provided with a pair of laterally spaced slots 75—75 in which the pivoted ends of the cable anchoring members 65—65 are swiveled by means of a transverse pivot pin extending through said end of the bracket and the anchoring members 65—65.

Means is further provided for yieldingly resisting downward and inward swinging movement of the carriage D, said means including a pair of toggle links 76 and 77 and a cooperating spring 78 associated with each side member of the carriage D. The toggle links 76 and 77 of each pair have their inner ends laterally offset, as indicated at 79—79, said offset ends being pivotally connected by a pin 80. The outer end of the link 76 is pivotally connected to the arm 47 of the corresponding side member of the carriage D substantially midway between the ends of said arm, and the outer end of the link 77 is pivotally supported in a bracket 81 fixed to the cabinet A. The two brackets 81—81 of the two pairs of toggle links are preferably fixed to a channel-shaped supporting bar 83 secured to the rear wall 13 of the cabinet at a point approximately midway of the height of said cabinet. The spring 78 has its upper end anchored to a plate 84 pivotally connected to a depending flange 85 on the hinged end of the arm 47 of the corresponding side member of the carriage D. The lower end of the spring 78 is anchored to a plate 86 pivoted on the pin 80 of the corresponding pair of toggle links 76 and 77.

Figure 4:
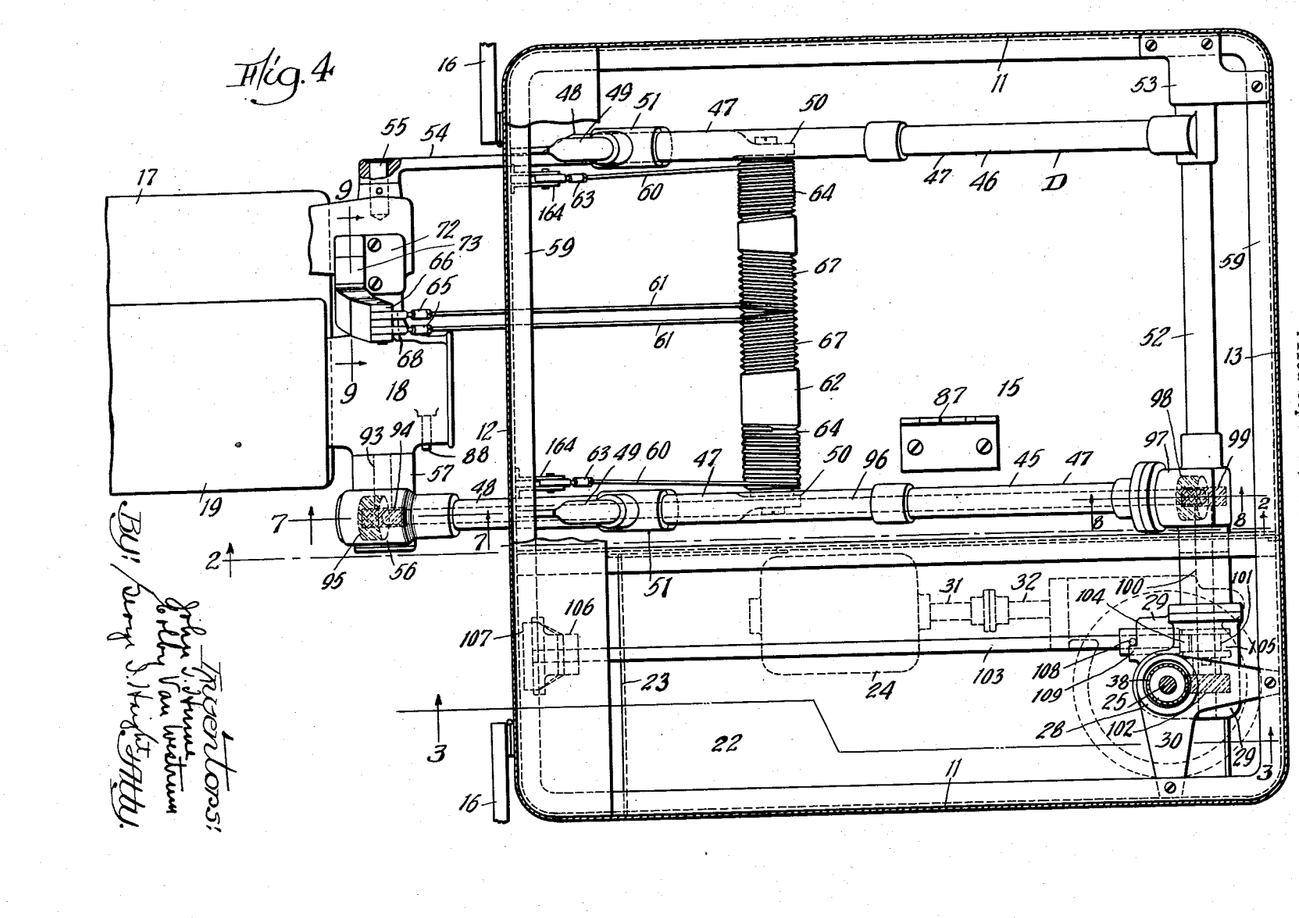
Fig. 4 is a transverse, horizontal, sectional view, on an enlarged scale, through the upper portion of the cabinet, showing the ironer partly broken away and in plan, said section corresponding substantially to the line 4—4 of Fig. 2.

When the ironer unit is in the extended operating position shown in Figs. 2 and 4, the cables 60—60 are fully wound on the drum 62 and the cables 61—61 are completely unwound therefrom, and the cables 60—60 and 61—61 are taut, thereby holding the stop arms 49—49 of the carriage D wedged tightly against the stop member 59. The carriage is thus maintained in the position shown in Fig. 2. As the cables 61—61 are anchored to the rocking arm 66, which is engaged by the fixed stop finger 68 of the standard 18 of the ironer unit, and as the ironer unit is pivoted to swing on the ends of the arms 48—48 of the carriage D, the eccentric weight of the ironer unit outwardly of said pivotal connection with the carriage presses the stop finger 68 against the arm 66, thus exerting a pull on the cables 61—61 and holding the same and the cables 60—60 taut and pressing the stop arms 49—49 against the stop member 59. As will be evident, the stop finger 68 in addition holds the ironer unit in the horizontal operating position shown in Fig. 2.

To move the ironer unit into the cabinet A, the attendant grasps the outer end of said unit and exerts an upward lifting pressure thereon, tending to swing the same upwardly on its pivotal connection with the carriage D. During this lifting action, the arm 66 will be swung in a right-hand direction, as viewed in Fig. 2, together with the ironer unit about the pivotal connection of the latter with the carriage D. The tension on the cables 61—61 will thus be slackened. Inasmuch as the entire weight of the ironer unit is carried and supported by the pivotal support between the same and the carriage D, and the force exerted by the weight of the ironer unit is in a downward direction, the carriage D will be forced to swing downwardly and inwardly controlled by the action of the cables 60—60 and 61—61, the cables 60—60 being unwound from the drum 62 while the cables 61—61 are wound thereon, the drum being rotated through the unwinding action of the cables 60—60. This downward swinging movement of the carriage D is yieldingly opposed by the spring-resisted toggle links 76—77 and 76—77. In lifting the outer end of the ironer unit, an inward pushing action toward the cabinet A is necessarily also applied thereto as the ironer unit is swung upwardly on its pivotal connection with the carriage D. The ironer unit is thus folded upwardly with respect to the carriage D while the carriage together with the ironer unit B is swung inwardly of the cabinet A. When the ironer unit B has been moved inwardly to the position shown in Fig. 5, the carriage D will have reached the inclined position shown in said figure and the spring 78 will be tensioned to its full extent, the toggle links having been swung to a position closely approaching parallel relation. In order to prevent the head end of the ironer unit B, that is, the end which is provided with the standard 18, from being swung too far into the cabinet, a combined stop and guide member in the form of an upstanding plate 87 is fixed to the bottom wall of the cabinet A. The plate 87 cooperates with a fixed stop projection or pin 88 laterally extending from the standard 18 of the ironer unit. The combined stop and guide member 87 is located in the ironer compartment of the cabinet A. The plate 87 is provided with a vertically disposed arcuate slot 89 adapted to slidingly accommodate the guide pin 88 of the ironer unit B. The slot 89 opens upwardly and is laterally flared at the top of the plate, thereby providing a guide wall 90 inclined outwardly toward the front of the cabinet A. The rear wall of the slot 89 projects upwardly beyond the narrow portion of said slot, thus providing a stop shoulder 91. The plate 87 is also recessed at the forward side, as indicated at 92, to provide clearance for the gear housing section 57, which is associated with the standard 18 of the ironer unit.

As the parts are swung toward the position shown in Fig. 5, in moving the ironer unit B into the cabinet A, the guide pin 88 will be directed into the arcuate slot 89 of the combined stop and guide member 87 and move along said slot as the ironer unit is swung still further inwardly to completely enclose the same within the cabinet A, as shown in Fig. 6. During the movement of the parts from the position shown in Fig. 5 to that shown in Fig. 6, the cooperating pin 88 and slot 89 of the ironer unit B and the guide 87 will hold the head end of said unit against movement toward the rear wall of the cabinet while permitting the necessary downward movement of said unit. Also during movement of the parts from the position shown in Fig. 5 to that shown in Fig. 6, the pull of the cables 61—61 will be in such a direction with respect to the pivoted bracket arm 66 that the latter will be swung away from the stop 68 on the ironer unit B and place the spring 74 under tension. As the toggle links 76 and 77 of each pair are practically at dead center in the position shown in Fig. 6, the ironer unit B and the carriage D will be held in their folded condition and it is necessary to exert an outward pull on the ironer unit to start outward swinging movement thereof to withdraw the same from the cabinet.

In withdrawing the ironer unit B from the cabinet A, the attendant grasps the upper end portion of said unit and pulls outwardly on the same. The initial movement of the ironer unit is in a direction outwardly of the cabinet on the pivotal connection between said unit and the carriage D, said unit moving from the position shown in Fig. 6 to that shown in Fig. 5. During this movement, the pin 88 travels upwardly in the slot 89 until it clears the same and the arm 66 is swung into engagement with the stop finger 68 on the ironer unit through the tension of the spring 74. As the ironer unit is withdrawn further from the cabinet A, the eccentric weight of the ironer unit tends to swing the same downwardly, thus effecting swinging movement of the carriage D upwardly through the pull exerted on the cables 61—61 by the arm 66 which is engaged by the finger 68, the cables 61—61 being unwound from the drum 62 and rotating the drum to wind the cables 60—60 thereon. The upward swinging movement of the carriage D is augmented by the tension springs 78—78 acting on the pairs of toggle links 76—77 and 76—77. The carriage D and the ironer unit B are thus swung to the position shown in Fig. 2. This movement of the parts is stopped in the last named position by the arms 49—49 of the carriage D engaging the stop member 59 on the cabinet A. As will be evident, the pressure exerted by the stop arms 49—49 is transmitted to the front of the cabinet A in an upward direction, thereby counterbalancing the downward movement of the ironer unit B and preventing tilting action of the cabinet, which might otherwise occur due to the downward pull of the ironer unit while being swung to the operating position shown in Fig. 2. The entire weight of the ironer unit is thus in effect supported at the rear of the cabinet.

The drive gearing for the ironer unit B for actuating the roll 19 and the shoe 20, which gearing is contained in the pedestal 18, as hereinbefore stated, is driven by the motor 24 through power-transmitting means associated with the carriage D and actuated by the motor-driven shaft 25. This power-transmitting means is operatively connected to a horizontally disposed shaft 93 extending laterally of the pedestal 18 of the ironer unit and forming a part of the drive gearing contained in said pedestal. The shaft 93 extends into the offset portion 57 of the gear casing 56 on the outer end of the arm 48 of the side member 45 of the carriage D and has a helical gear 94 fixed thereto and meshing with a helical gear 95 on the end of a shaft 96 rotatably journaled in the arms 48 and 47 of the side member 45. The opposite end of the shaft 96 extends into an enlarged gear casing portion 97 at the joint of said arm 47 of the side member 45 and the tubular transverse member 52 and has a helical gear 98 fixed to said end thereof, which gear 98 is in mesh with a helical gear 99 fixed to a shaft 100 rotatably journaled in the tubular member 52. The shaft 100 extends into the gear casing 29 at the upper end of the tubular housing 26 and has a sliding sleeve 101 splined thereon, the sleeve 101 being provided with a helical gear member 102 adapted to mesh with the helical gear 38 at the upper end of the shaft 25. The sleeve 101 is shiftable lengthwise of the shaft 100 by a shifting member in the form of a rotary rod 103 journaled in the gear casing 29 and having an eccentric head 104 at its inner end engaged in an annular groove 105 of the sleeve 101. The outer end of the rod 103 is supported by a hanger 106 in which it is journaled, the hanger 106 being located at the front of the cabinet near the top thereof. A knurled button or wheel 107 is fixed to the outer end of the rod 103 for turning the latter to shift the sleeve 101. Stop means in the form of a pin 108 on the rod 103 cooperates with diametrically opposite shoulders on the gear casing 29, one of said shoulders only being shown and the same being designated by 109. The shoulders limit the rotary movement of the rod 103 in reverse directions, thereby determining the extent of sliding movement of the sleeve 101. When the sleeve 101 is in the position shown in Fig. 4, the gear 102 is in mesh with the gear 38 of the shaft 25 and the power is transmitted from the motor 24 to the ironer unit B through the power-transmitting means associated with the carriage D. When it is desired to drive the mixer through the shaft 25, the driving means for the ironer unit B is disconnected by shifting the sleeve 101 through rotation of the rod 103 to completely disengage the gear 102 from the gear 38, and the mixer is mounted on top of the cabinet with the drive shaft thereof in coupled engagement with the splined end 35 of the shaft 25.

Figure 10:
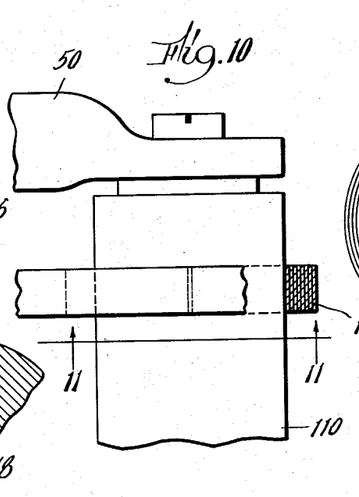
Fig. 10 is an enlarged plan view of one end portion of a modified form of guide and winding drum for the flexible connecting means for supporting the ironer unit, said flexible connecting means being shown partly in plan and partly in section and the drum being shown fragmentarily, one end portion of the supporting guide arm at the corresponding end of the drum being also illustrated in plan.
Figure 11:
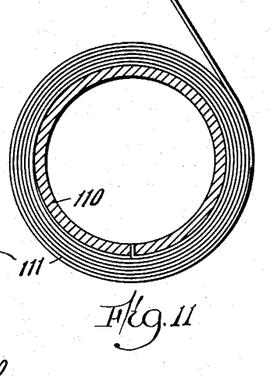
Fig. 11 is a vertical, sectional view, corresponding substantially to the line 11—11 of Fig. 10.

Referring to the modification shown in Figs. 10 and 11, a plain cylindrical winding drum 110 is employed in place of the winding drum 62 and flexible members in the form of flat bands are employed in place of the cables 60—60 and 61—61, one of said bands being indicated by 111. The band 111 is adapted to be spirally wound on the drum 110. As will be understood, four such bands are employed, one pair being anchored to the cabinet A in the same manner as the cables 60—60 and the other pair being anchored to the pivoted arm 66 of the ironer unit B in the same manner as the cables 61—61. The two pairs of bands are arranged to be reversely wound on the drum so that when one pair is unwound, the other pair will be wound on the drum in a manner similar to the cables 60—60 and 61—61.

We have herein shown and described what we now consider the preferred manner of carrying out our invention, but the same is merely illustrative and we contemplate all changes and modifications that come within the scope of the claims appended hereto.

We claim:

1. In a structure of the class described, the combination with a cabinet; of an ironer unit arranged to occupy a vertical position within the cabinet and a horizontal operating position exteriorly of said cabinet; means associated with said cabinet and ironer unit for supporting the ironer unit in either of its positions and for turning the ironer unit in its movement from one position to the other; power-transmitting means carried by said last named means for actuating the ironer unit; and a motor fixedly mounted within the cabinet and operatively connected to said power-transmitting means for actuating the latter.

2. In a structure of the class described, the combination with a cabinet; of an ironer unit including an ironer roll and a cooperating shoe; means connected to the ironer unit and cabinet for supporting said ironer unit in operating position outside of the cabinet and guiding said unit into and out of the cabinet; power-transmitting means carried by said last named means operatively connected to said ironer unit for actuating the roll and shoe thereof; a motor fixedly mounted in said cabinet; and driving connections between said motor and power-transmitting means operatively connecting the same.

3. In a structure of the class described, the combination with an ironer unit including an ironer roll, a cooperating shoe, and means for actuating said roll and shoe; of a cabinet adapted to house said ironer unit when not in use; a carriage movably supported by said cabinet and carrying said ironer unit, said carriage being movable in reverse directions to position said ironer unit within the cabinet and project said unit in operating position outside of said cabinet; rotary power-transmitting means mounted on said carriage, said power-transmitting means being operatively connected to said actuating means; and a driving motor fixedly mounted in said cabinet and operatively connected to said power-transmitting means.

4. In a structure of the class described, the combination with an ironer unit including an ironer roll, a cooperating shoe, and means for actuating said roll and shoe; of a cabinet adapted to house said ironer unit when not in use; a carriage for said ironer unit swingingly supported within said cabinet, said carriage being swingable in reverse directions to move said ironer unit out of the cabinet into projected operating position or move the same into completely enclosed position within said cabinet; power-transmitting means on said swinging carriage operatively connected to the actuating means of said ironer unit; and a driving motor fixedly mounted within said cabinet and operatively connected to said power-transmitting means.

5. In a structure of the class described, the combination with a cabinet; of an elongated power driven ironer unit; supported and guiding means connected to the interior of the cabinet and operatively connected to the inner end of said ironer unit for guiding the same into and out of the cabinet and holding the ironer unit in horizontal operating position entirely outside of the cabinet, said ironer unit being foldable with respect to said supporting and guiding means; and means for causing folding movement of said ironer unit to confine the same to upward swinging movement with respect to said cabinet during movement of the ironer unit into said cabinet.

6. In a structure of the class described, the combination with a cabinet; of an elongated power driven ironer unit; a carriage for said ironer unit swingingly supported within said cabinet and hinged to the inner end of said unit for guiding said unit for movement into and out of the cabinet; and means for controlling the movement of said ironer unit and carriage with respect to each other to allow folding of said ironer unit upwardly with respect to said carriage when the unit is moved into the cabinet and unfolding of said ironer unit in a downward direction when the same is moved out of said cabinet.

7. In a structure of the class described, the combination with a cabinet; of an elongated power driven ironer unit; means carried by said cabinet and connected to the inner end of said unit for supporting and guiding said unit for movement into and out of the cabinet and holding the same in horizontal operating position entirely outside of the cabinet; and means for allowing upward folding movement of said ironer unit while guided into said cabinet to bring the same to vertical position when completely moved into said cabinet.

8. In a structure of the class described, the combination with a cabinet; of an elongated ironer unit; and a carriage swingingly suspended within said cabinet and hinged to the inner end of said unit, said carriage being swingingly supported at the top of said cabinet whereby the hinged end of the ironer unit is swung towards the bottom end of said cabinet and the ironer unit is foldable upwardly into said cabinet with respect to said carriage when said ironer unit is moved into said cabinet.

9. In a structure of the class described, the combination with a cabinet; of an elongated ironer unit; a carriage operatively connected to the cabinet and supporting said ironer unit and guiding the same for movement into and out of the cabinet, said unit being hinged at its inner end to the carriage and foldable with respect to the same; and means controlled by upward and downward swinging movement of said unit for moving said carriage respectively inwardly and outwardly of said cabinet.

10. In a structure of the class described, the combination with a cabinet; of an elongated ironer unit; a carriage guided in said cabinet and connected to the inner end of said unit for supporting the latter in horizontal operating position outside of the cabinet and carrying the same into and out of the cabinet, the inner end of said unit being hinged to said carriage whereby the unit is foldable with respect to the carriage; and means controlled by the folding and unfolding movements of said unit with respect to the carriage for moving said carriage respectively inwardly and outwardly of the cabinet.

11. In a structure of the class described, the combination with a cabinet; of an elongated power driven ironer unit; a carriage connecting the ironer unit and the cabinet, the inner end of said unit being hinged to the carriage, said carriage being movable in reverse directions to move said unit into and out of the cabinet; and means controlled by the eccentric weight of said unit for locking the carriage against movement with respect to the cabinet to hold said ironer unit in horizontal operating position entirely outside of the cabinet.

12. In a structure of the class described, the combination with an elongated ironer unit; of a cabinet adapted to house said ironer unit when not in use; and means for supporting said ironer unit in horizontal operating position outside of the cabinet, said means including a movable carriage connected to said cabinet for movement inwardly and outwardly of the same, means pivotally connecting the inner end of the ironer unit to said carriage, stop means on the cabinet for limiting outward movement of said carriage, and means connected to the cabinet and operated by the eccentric weight of said ironer unit for forcing said carriage against the stop means.

13. In a structure of the class described, the combination with an elongated ironer unit; of a cabinet adapted to house said unit when not in use; movable means to which the inner end of said ironer unit is hinged for guiding said unit into and out of the cabinet; and means operatively connecting said cabinet and ironer unit and engaging with said movable means for counterbalancing the weight of said unit when guided into and out of the cabinet by said movable means, said connecting means being actuated by the leverage of said ironer unit about its hinged connection.

14. In a structure of the class described, the combination with an elongated ironer unit; of a cabinet adapted to house said ironer unit when not in use; supporting means movably carried by said cabinet to which the inner end of said ironer unit is hinged; and means reacting between said ironer unit, cabinet, and supporting means and actuated by swinging movement of said ironer unit on its hinged connection, for effecting movement of said supporting means to displace said hinged connection downwardly and inwardly of the cabinet or upwardly and outwardly with respect to the cabinet.

15. In a structure of the class described, the combination with a cabinet; of a swinging support within said cabinet mounted for movement outwardly and inwardly of the cabinet; stop means on the cabinet for limiting outward swinging movement of said support; an elongated ironer unit hinged at its inner end to said support; and means anchored to said cabinet and connected to said ironer unit at a point eccentric to the hinged connection thereof, said last named means engaging said support to hold the latter in its outermost position in engagement with said stop means to thereby maintain said ironer unit in horizontal operating position.

16. In a structure of the class described, the combination with an elongated ironer unit; of a cabinet adapted to house said ironer unit when not in use; a swinging support mounted within the cabinet to the outer end of which the inner end of said ironer unit is hinged to swing toward and away from said support; and means actuated by swinging movement of said ironer unit with respect to said support for controlling the swinging movement of said support inwardly and outwardly of the cabinet to effect folding and unfolding movements of said ironer unit and support.

17. In a structure of the class described, the combination with an elongated ironer unit; of a cabinet adapted to house said ironer unit when not in use; stop means on said cabinet at the front thereof adjacent to its top; means for supporting said ironer unit entirely on said cabinet, said supporting means being anchored to the rear of the cabinet adjacent to the top thereof; and means responsive to the action of gravity on the ironer unit for buttressing said supporting means against said stop means, whereby said ironer unit is disposed in horizontal operating position exteriorly of said cabinet, said supporting means being movable into and out of the cabinet to place said ironer unit within the cabinet and withdraw the same therefrom.

18. In a structure of the class described, the combination with an elongated ironer unit; of a cabinet adapted to house said unit when not in use; a support swingably connected at its inner end to the upper portion of said cabinet and having a hinged connection at its outer end with the inner end of the ironer unit; a stop on said cabinet to limit upward swinging movement of said support; and means connected to said ironer unit eccentric to the hinged connection thereof and reacting between said cabinet and support for forcing the latter upwardly against said stop, said means for forcing the support upwardly being operated through the action of gravity on said ironer unit, thereby holding said ironer unit in horizontal operating position outside of said cabinet.

19. In a structure of the class described, the combination with a cabinet; of a carrier swingingly connected at its inner end to the rear portion of said cabinet adjacent to the top thereof; an elongated ironer unit having its inner end hinged to the outer end of said carrier; stop means at the front of said cabinet adjacent to the top thereof adapted to be engaged by said carrier to limit outward swinging movement thereof; and cable means supporting the outer end portion of said carrier, said cable means being anchored to the cabinet and said ironer unit, the point of anchorage of said cable means on said ironer unit being eccentric to the hinged connection of said unit with the carrier.

20. In a structure of the class described, the combination with a cabinet; of a carrier swingingly connected to said cabinet; an elongated ironer unit having its inner end hinged to the outer end of said carrier; a stop on said cabinet limiting outward movement of said carrier; a rotary winding drum on said carrier remote from the pivotal axis thereof; and cable means trained about said drum and anchored to said cabinet and ironer unit, said cable means being connected to the ironer unit at a point offset from the hinged connection thereof, said cable means positioning the carrier against the stop when the ironer unit is fully withdrawn from the cabinet and controlling the relative folding movements of the ironer unit and carrier in moving the unit into or out of the cabinet and also controlling the inward and outward swinging movements of the carrier when the ironer unit is moved into and out of the cabinet.

21. In a structure of the class described, the combination with an elongated ironer unit; of a cabinet adapted to house said unit; a carriage for said ironer unit swingingly supported in said cabinet for movement inwardly and outwardly of the cabinet, said ironer unit being hinged to the carriage to fold toward and away from the same; means yieldingly opposing inward movement of said carriage; and means connected to said ironer unit and cabinet and cooperating with said carriage to control movement of the same with respect to the cabinet and to control folding movement of said ironer unit with respect to said carriage.

22. In a structure of the class described, the combination with an elongated ironer unit; of a cabinet adapted to house said unit; a carriage for said ironer unit swingingly supported in said cabinet for movement inwardly and outwardly of the cabinet, said ironer unit being hinged to the carriage to fold toward and away from the same; spring-resisted toggle means yieldingly opposing inward movement of said carriage; and means connected to said ironer unit and cabinet and cooperating with said carriage to control movement of the same with respect to the cabinet and to control folding movement of said ironer unit with respect to said carriage.

23. In a cabinet ironer, the combination with an elongated ironer unit; of a cabinet adapted to house said unit when not in use; a carrier swingingly supported within said cabinet, said ironer unit having its inner end hinged to the outer end of said carrier, said unit being foldable toward and away from said carrier while the carrier is swung inwardly and outwardly of the cabinet; and means operated by movement of said ironer unit for controlling and coordinating the folding movements of said ironer unit and the swinging movements of said carrier.

24. In a cabinet ironer, the combination with an elongated ironer unit; of a cabinet adapted to house said unit when not in use; a carrier swingingly supported within said cabinet, said ironer unit having its inner end hinged to the outer end of said carrier, said unit being foldable toward and away from said carrier while the carrier is swung inwardly and outwardly of the cabinet; means operated by movement of said ironer unit for controlling and coordinating the folding movements of said ironer unit and the swinging movements of said carrier; and cooperating guide means on said cabinet and ironer unit for limiting the movement of the hinged end of said ironer unit in a direction inwardly of the cabinet.

25. In a structure of the class described, the combination with an elongated ironer unit; of a cabinet adapted to house said unit when not in use; a carrier for said ironer unit swingingly supported in the cabinet for carrying said unit into and out of the cabinet; a winding drum on said carrier remote from the pivot thereof; stop means on the cabinet for limiting outward movement of said carrier; hinge means at the inner end of said ironer unit connecting the same to the outer end of said carrier; a cable anchored to said cabinet adjacent to said stop means; and a second cable anchored to the ironer unit at a point removed from its hinged connection, said cables being fixed to the drum and windable thereon in reverse directions to control the movement of said carrier with respect to the ironer unit and cabinet and hold said ironer unit in horizontal operating position outside of the cabinet when said stop means arrest movement of said carrier.

JOHN T. HUME.
COLBY VAN WESTRUM.